United States Patent [19]

Chen et al.

[11] Patent Number: 5,394,391
[45] Date of Patent: * Feb. 28, 1995

[54] METHOD OF CONTROLLING THE OPERATION OF A PACKET SWITCHED CDMA TELECOMMUNICATION NETWORK

[75] Inventors: Xiao H. Chen; Juhani Oksman, both of Oulu, Finland

[73] Assignee: Nokia Mobile Phones Ltd., Salo, Finland

[ * ] Notice: The portion of the term of this patent subsequent to Oct. 26, 2010 has been disclaimed.

[21] Appl. No.: 119,225

[22] PCT Filed: Apr. 3, 1992

[86] PCT No.: PCT/FI92/00098

§ 371 Date: Sep. 27, 1993

§ 102(e) Date: Sep. 27, 1993

[87] PCT Pub. No.: WO92/17964

PCT Pub. Date: Oct. 15, 1992

[30] Foreign Application Priority Data

Apr. 5, 1991 [FI] Finland ................... 911648

[51] Int. Cl.[6] ............. H04B 7/216; H04J 11/00; H04J 13/00
[52] U.S. Cl. ..................... 370/18; 370/19; 370/60; 370/85.3; 375/205
[58] Field of Search ............. 370/18, 19, 21, 24, 370/60, 85.2, 85.3, 94.1; 375/1; 341/60; 371/32, 33

[56] References Cited

U.S. PATENT DOCUMENTS

| | | | |
|---|---|---|---|
| 4,494,228 | 1/1985 | Gutleber | 370/18 |
| 4,779,265 | 10/1988 | O'Connor et al. | 370/18 |
| 4,779,266 | 10/1988 | Chung et al. | 370/18 |
| 4,841,527 | 6/1989 | Raychaudhuri et al. | 371/32 |
| 4,901,307 | 2/1990 | Gilhousen et al. | 370/18 |
| 5,014,295 | 5/1991 | Kunihiro | 379/61 |
| 5,022,046 | 6/1991 | Morrow, Jr. | 375/1 |
| 5,084,900 | 1/1992 | Taylor | 375/1 |
| 5,090,024 | 2/1992 | Vander Mey et al. | 370/85.3 |
| 5,257,257 | 10/1993 | Chen et al. | 370/18 |

FOREIGN PATENT DOCUMENTS

| | | |
|---|---|---|
| 462572 | 12/1991 | European Pat. Off. . |
| 676179 | 12/1990 | Switzerland . |
| 9107020 | 5/1991 | WIPO . |

*Primary Examiner*—Alpus H. Hsu
*Attorney, Agent, or Firm*—Cushman Darby & Cushman

[57] ABSTRACT

A method of controlling the operation of a packet switched CDMA telecommunication network, wherein N network users are connected to the network by respective terminals, and the terminal of each user is assigned an orthogonal receiver code. To improve the properties of the packet network, the network terminal wanting to transmit senses the channel forming the transmission path for the presence of the receiver code of the other communicating party, i.e. the receiving terminal, in signals transmitted by the other terminals, the receiving terminal being the terminal to which the sensing terminal wants to transmit data in packet format. If the receiver code is not detected in the channel, the terminal wanting to transmit initiates the transmission of packet-format data encoded by the receiver code, whereas if the receiver code is detected in the channel, the terminal wanting to transmit remains waiting so as to repeat the above-described sensing algorithm after a period of time.

3 Claims, 4 Drawing Sheets

METHOD OF CONTROLLING THE OPERATION OF A PACKET SWITCHED CDMA TELECOMMUNICATION NETWORK

BACKGROUND OF THE INVENTION

The invention relates to a method of controlling the operation of a packet switched CDMA telecommunication network, wherein N network users are connected to the network by a respective terminal, and each terminal communicates by means of a transmitter and a receiver with a receiver and a transmitter of another terminal via a CDMA channel forming the transmission path, and wherein a substantially orthogonal receiver code is assigned to the terminal of each user, which code is used by the other terminals of the network for addressing and encoding packets to the particular terminal.

In a packet switched network or a packet network, data is addressed and provided with control information and then transmitted in packets of specified format, the data transmission line being assigned to the transmission of a single data packet at a time, whereafter the transmission channel is assigned to other transmission functions.

Packet switched telecommunication networks are used widely in computer communications, digital telephone systems and mobile communication networks. As compared with the previous circuit switched network, the packet switched network enables a more efficient utilization of the available frequency band and other telecommunication network resources. The packet switched network is particularly applicable in burst transmission in which the data to be transmitted consists of short data periods and long idle periods during which no data is transmitted between the communicating parties. In such operation several slightly loaded transmission lines are replaced by a single transmission line which is shared by a number of different users, and so the users of the network transmit data via a common transmission line.

A packet network employing code division multiple access (CDMA) provides each user with a code, and these codes, orthogonal with respect to each other, are used to encode data packets to be transmitted. In the CDMA packet network, all users share the same available frequency band. It is important in which way the used codes are associated with each user and in which way they are assigned to the different users. These two functions are usually performed in accordance with a special code spreading protocol. CDMA packet networks employ code spreading protocols of different kinds, such as the common code (C) protocol, the receiver-based (R) code protocol, the transmitter-based (T) code protocol, the common transmitter-based (C-T) code protocol and the receiver-transmitter based (R-T) code protocol. The naming of the code spreading protocol depends on the assignment of the code, that is, on the function with which the code is associated. In the R code protocol, for instance, the network terminal of each user is assigned a code which the other network users use when encoding and transmitting data packets to the particular user, that is, to the receiver in the same network.

However, when using a conventional code spreading protocol, an adequate performance is not achieved, especially as far as the throughput is concerned. The present inventors have observed that none of the above-mentioned conventional code spreading protocols provides a throughput efficiency higher than 0.36. As the traffic load of the network increases, the network is more probable to get into a backlog state in which the throughput is extremely low and long delays occur in the network. Thus, the present-day conventional code spreading protocols do not provide sufficiently good results, which is due to the fact that the packet transmissions are started at random, and so packet collisions are inevitable with increasing traffic load of the network.

To eliminate the above-mentioned problems, it is previously known to use a channel load sensing protocol intended especially for a broadband CDMA packet network employing the R code protocol. However, the codes used in the above-mentioned prior art method and in protocols used in other CDMA networks are not always fully orthogonal with respect to each other, and so the cross-correlation between two codes may also deviate from zero. The probability and level of cross-correlation increase with the number of codes of different users in the channel. In the above-mentioned prior art channel load sensing method, the level of cross-correlation is monitored on the receiver side, thus obtaining a rough estimate of the number of users in the network at any given time. If the level of cross-correlation exceeds a predetermined value, i.e. a CDMA threshold, the transmitter remains waiting for a reduction in the level of cross-correlation. The channel load sensing protocol cannot, however, determine which receiver and/or transmitter is busy at a given time, but it only determines the number of active users. The channel load sensing protocol also operates poorly when the level of cross-correlation is less than the CDMA threshold value, whereas the user, that is, the terminal to which the transmitter wants to transmit a packet, is busy, and so collisions of packets inevitably result after transmission. In order words, the prior art protocol described above is "blind".

Known methods also include the Carrier Sense Multiple Access (CSMA) protocol, i.e. a contention bus, the purpose of which is to prevent random transmission of packets by sensing the bus for the same carrier frequency before a new packet is transmitted. Packet transmission is initiated if the same carrier frequency is not detected in the bus. The CSMA protocol reduces packet collisions but it is applicable to narrow band packet networks only. The CSMA protocol is not either in other respects well suited for use in conjunction with the CDMA network, because the simultaneous transmission of several packets, which is possible in the CDMA network, cannot be detected on the same carrier frequency in accordance with the CSMA protocol.

A further known protocol is the Busy Tone Multiple Access (BTMA), in which each busy receiver in the network at a given time indicates its busy state by transmitting a busy tone signal in a separate busy-tone channel. The BTMA protocol is applicable only to narrow band packet networks.

SUMMARY OF THE INVENTION

An object of the present invention is to provide a method of controlling the operation of a packet switched CDMA network, which method avoids the problems and disadvantages associated with the prior art. This object is achieved by a method according to the invention, which is characterized in that the network terminal wanting to transmit senses the channel forming the transmission path for the presence of the receiver code of the other communicating party, i.e. the receiving terminal, in signals transmitted by the other terminals, the receiving terminal being the terminal to which the sensing terminal wants to transmit data in packet format, and that if the receiver code is not detected in the channel, the terminal wanting to transmit initiates the transmission of packet-format data encoded by the receiver code to the receiver of the receiving terminal, whereas if the receiver code is detected in the channel, the terminal wanting to transmit remains waiting so as to repeat the above-described sensing algorithm after a period of time. The period of time is preferably random.

The method is based on the idea that the method utilizes a protocol identifying the code of the receiver by sensing the channel, and so it is possible to determine which receiver is busy or is not busy at any given time.

The method according to the invention provides many advantages, such as a significant improvement in the throughput to a value which is considerably in excess of the throughput obtained by the best conventional spreading code (R-T spreading code). Delays occurring in the CDMA network are also shortened considerably as collisions between packets in the transmission channel are considerably less frequent than previously. There is also a significant decrease in the number of channel backlogs and the stability properties of the network are improved. The method according to the invention is also relatively easy to apply in a CDMA network, and it can be realized with existing equipment with slight modifications and additions.

BRIEF DESCRIPTION OF THE DRAWINGS

In the following the invention will be described in greater detail with reference to the attached drawings, in which.

DETAILED DESCRIPTION

Figure 6:
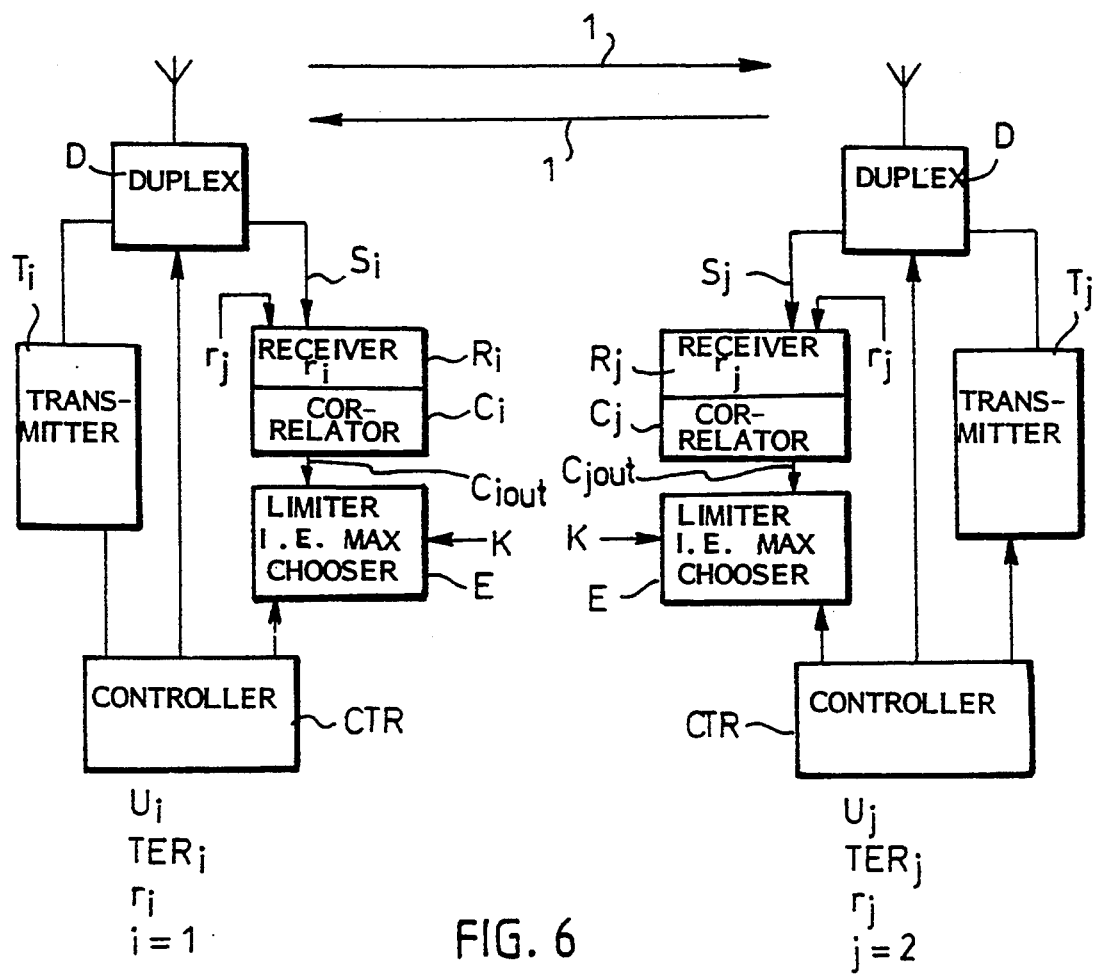
FIG. 6 is a simplified block diagram of a packet switched network.

FIG. 6 shows a simplified block diagram of a packet network, comprising a pair of two users $U_i$ and $U_j$ communicating via a channel 1.

FIG. 6 shows a packet network comprising merely two users $U_1$ and $U_2$ and their terminals $TER_1$ and $TER_2$ interconnected by the CDMA channel 1, that is, the number N of users is 2. In practice, the packet network comprises more users, that is, N different users, which are connected to the packet network by respective terminals $TER_{1 \rightarrow N}$ and transmit data in packets at a rate $\lambda$ packets/s. The same channel 1 can also be used by all the other users in the network. The terminal $TER_i$ comprises a transmitter $T_i$ and a receiver $R_i$ with a correlator $C_i$, where i is in the range $1 \rightarrow N$. The other communicating party, that is, the terminal $TER_j$ comprises a transmitter $T_j$ and a receiver $R_j$ with a correlator $C_j$, where j is in the range $1 \rightarrow N$ so that i is different from j.

Each terminal $TER_{1 \rightarrow N}$ in the network and thus each user $U_{1 \rightarrow N}$ is provided with a specific receiver sensing code $r_{1 \rightarrow N}$, so that the user $U_i$, for instance, has the receiver sensing code $r_i$ and the user $U_j$ has the receiver sensing code $r_j$. If one wants to transmit a packet message from the transmitter $T_i$ of the terminal $TER_i$, the packet is encoded by means of the receiver sensing code $r_j$ of the receiver $R_j$ of the other communicating party, that is, the terminal $TER_j$.

According to the invention, if the user $U_i$, for instance, wants to transmit data in packet format via the transmitter $T_i$ of the terminal $TER_i$ to the user $U_j$, i.e. to the receiver $R_j$ of the terminal $TER_j$, the channel 1 acting as the transmission path is sensed so as to see if the receiver sensing code $r_j$ of the other communicating party $TER_j$ is already present in the channel 1, because it may be present in the channel 1, if another transmitter is already transmitting packet-format data encoded with the sensing code $r_j$ to the receiver $R_j$ of the terminal $TER_j$. If the terminal $TER_i$ detects the receiver sensing code $r_j$ of the other communicating party $TER_j$ in the channel 1 forming the transmission path, the transmitter $T_i$ of the terminal $TER_i$ does not initiate the transmission of the packet, but remains waiting, and repeats the sensing procedure after a random delay. If the terminal $TER_i$ now detects no sensing code $r_j$ in the channel 1, the transmitter $T_i$ of the terminal $TER_i$ initiates the transmission to the receiver $R_j$ of the terminal $TER_j$ via the channel 1 forming the transmission path. In practice, the absence of the receiver sensing code $r_j$ in the transmission path 1 means that the other transmitter, which earlier transmitted to the receiver $R_j$ of the terminal $TER_j$, has terminated its transmission. If the terminal $TER_i$ detects at once that the receiver sensing code $r_j$ of the receiver $R_j$ of the other communicating party, that is, the terminal $TER_j$ is not present in the channel 1, that is, the transmission path, it initiates its transmission immediately.

Duplexers D forward the packets to the CDMA channel 1 and away from the channel 1, and controllers CTR control the operation of the terminals.

Figure 5:
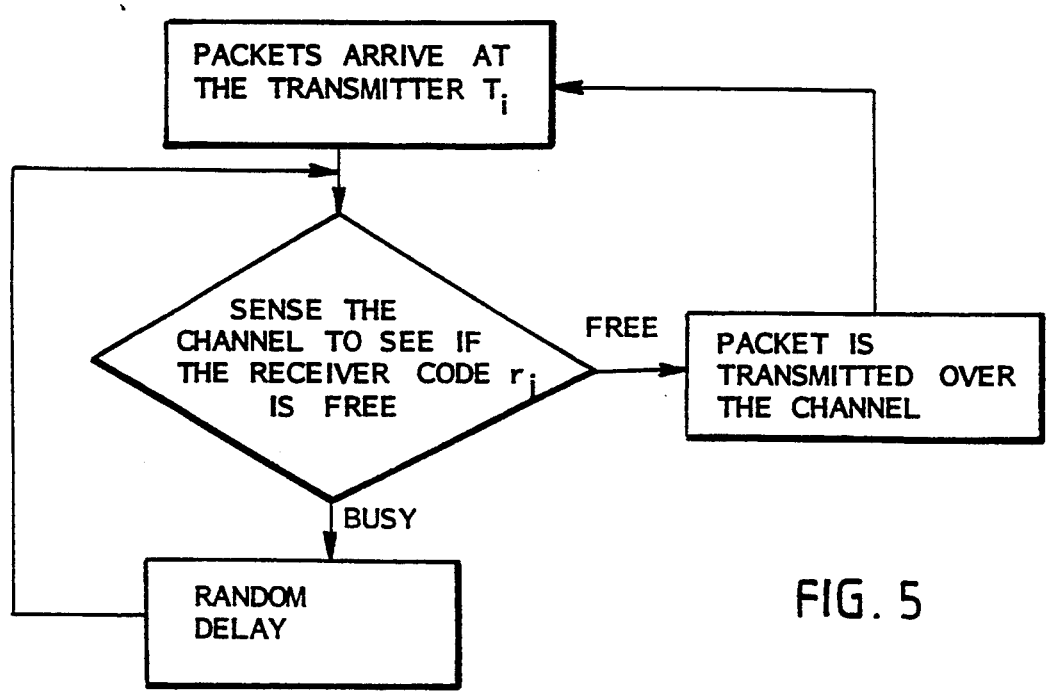
FIG. 5 is a flow chart illustrating the method according to the invention.

As shown in FIG. 5, packets to be transmitted arrive at the transmitter, whereafter the channel is sensed to see if the code of the receiver to which the transmitter wants to transmit the packet is already busy or free. If the code is free, that is, it is not present in the channel, the packet/packets is/are transmitted to the transmission channel and further to the receiver of the terminal of the other communicating party. If the code is busy, one waits for a random period of time, whereafter the sensing procedure is repeated.

The basic idea of the invention can thus be realized in such a way that N network users are connected to the network by a respective terminal $TER_i$, $TER_j$, i, $j=1 \rightarrow N$, and each terminal $TER_i$ communicates by means of a transmitter $T_i$, $i=1 \rightarrow N$ and a receiver $R_i$, $i=1 \rightarrow N$ with a receiver $R_j$ and a transmitter $T_j$ of another terminal $TER_j$, $j=1 \rightarrow N$ via a CDMA channel 1 forming the transmission path, and wherein a receiver code $r_i$, $r_j$, i, $j=1 \rightarrow N$ is assigned to the terminal $TER_i$, $TER_j$ of each user, which code is used by the other terminals of the network for addressing and encoding packets to the particular terminal. According to the invention, the network terminal $TER_i$, $i=1 \rightarrow N$ wanting to transmit senses the channel 1 forming the transmission path for the presence of the receiver code $r_j$ of the other communicating party, i.e. the receiving terminal $TER_j$, in signals $S_i$ transmitted by the other terminals, said receiving terminal $TER_j$ being the terminal to which the sensing terminal $TER_i$ wants to transmit data in packet format, and if the receiver code $r_j$ is not detected in the channel, the terminal $TER_i$ wanting to transmit initiates the transmission of packet-format data encoded by the receiver code $r_j$ to the receiver $R_j$ of the receiving terminal $TER_j$, whereas if the receiver code $r_j$ is detected in the channel, the terminal $TER_i$ wanting to transmit remains waiting so as to repeat the above-described sensing algorithm after a period of time. The waiting time of the terminal is preferably random.

Figure 7:
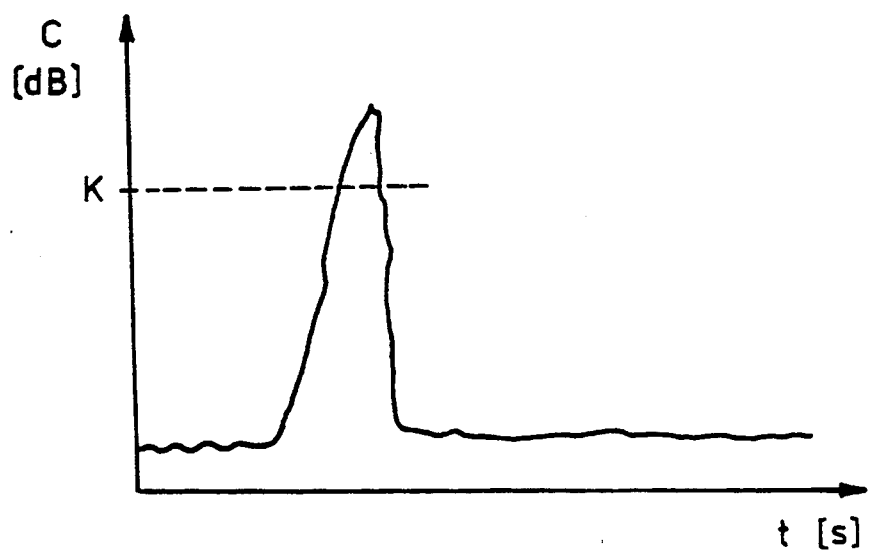
FIG. 7 is a graphic representation of correlation.

In a preferred embodiment of the method according to the invention, the sensing of the receiver code $r_j$ can be carried out by applying a signal $S_i$ derived from the channel 1 and comprising different codes $r_{1-N}$ to be transmitted in the channel, if there is any traffic in the channel, to a correlator $C_i$ included in the receiver $R_i$ of the transmitting terminal $TER_i$. The receiver sensing signal $r_j$ of the receiver $R_j$ of the terminal $TER_j$ is applied to another input in the correlator $C_i$ of the receiver $R_i$. If the signal applied from the channel 1 to the correlator $C_i$ contains the code $r_j$, an auto-correlation peak considerably higher than the cross-correlation between the different codes can be detected in an output $C_i$out of the correlator. This peak is due to the auto-correlation between two identical codes $r_j$. In the graphic representation of FIG. 7, the low curve portions represent the cross-correlation between codes substantially orthogonal with respect to each other, and the high peak represents the auto-correlation of the code $r_j$ with itself. On the basis of the occurrence of auto-correlation it is easy to monitor the presence of a certain code in the channel acting as the transmission mission path, and so it can be determined if the receiver $R_j$, to which the transmitter $R_i$ wants to transmit data in packet format, is busy with some other transmitter. If the level of auto-correlation in the output of the correlator $C_i$ is not sufficiently high, that is, does not exceed a threshold value K, the transmitter $T_i$ of the terminal $TER_i$ knows that the receiver $R_j$ is not busy, and therefore the transmitter $T_i$ can transmit the data packets waiting for transmission.

In the preferred embodiment of the invention, the channel 1 forming the transmission path is thus sensed for the presence of the receiver code $r_j$ by applying a signal $S_i$, derived from the channel 1 and comprising receiver codes $r$ present in the signals transmitted by the other terminals, to the correlator $C_i$ included in the receiver $R_i$ of the sensing terminal, that is, the terminal $TER_i$ wanting to transmit, in addition to which an identifying receiver code $r_j$ of the other communicating party, that is, the receiving terminal $T_j$ is also applied to the correlator $C_i$ as a reference, whereafter the correlation between the two above-mentioned parameters applied to the correlator $C_i$ is measured in an output $C_i$out of the correlator $C_i$. It is to be mentioned that each terminal is able to generate all the identifying receiver codes $r$ of the other terminals as a reference one at a time, or these receiver codes can be applied to it e.g. from the controller CTR.

If the level of auto-correlation, i.e. correlation between the receiver code $r_j$ already present in the signal $S_i$ measured from the channel 1, i.e. the receiver code $r_j$ sensed from the channel 1, and the same receiver code $r_j$ applied to the correlator as a reference, in the output $C_i$out of the correlator $C_i$ exceeds the predetermined threshold value K, the transmitter $T_i$ of the sensing terminal, that is, the terminal $TER_i$ wanting to transmit, remains waiting and does not yet start the transmission of the packet to the receiver $R_j$ of the receiving terminal $TER_j$. If the level of auto-correlation is less than the pre-determined threshold value K, the transmission of the packet can be initiated.

A limiter i.e. a maximum chooser E determines whether the output $C_i$out of the correlator $C_i$ exceeds the predetermined threshold value K. Correspondingly, in the terminal $TER_j$, another limiter i.e. maximum chooser E determines whether the output $C_j$out of the correlator $C_j$ exceeds the predetermined threshold value K.

The graphic representations of FIGS. 1, 2, 3, and 4 illustrate the performance to be obtained by the method according to the invention as compared with a performance obtained by conventional spreading codes. In FIGS. 1-4, the horizontal axis represents a normalized channel load r; the scale has been obtained by dividing the transmission rate $\lambda$ of the packets by the reciprocal u of one time unit. All FIGS. 1-4 illustrate a network comprising 8 users, that is, N=8 and 1/u=1.0 ms.

Figure 1:
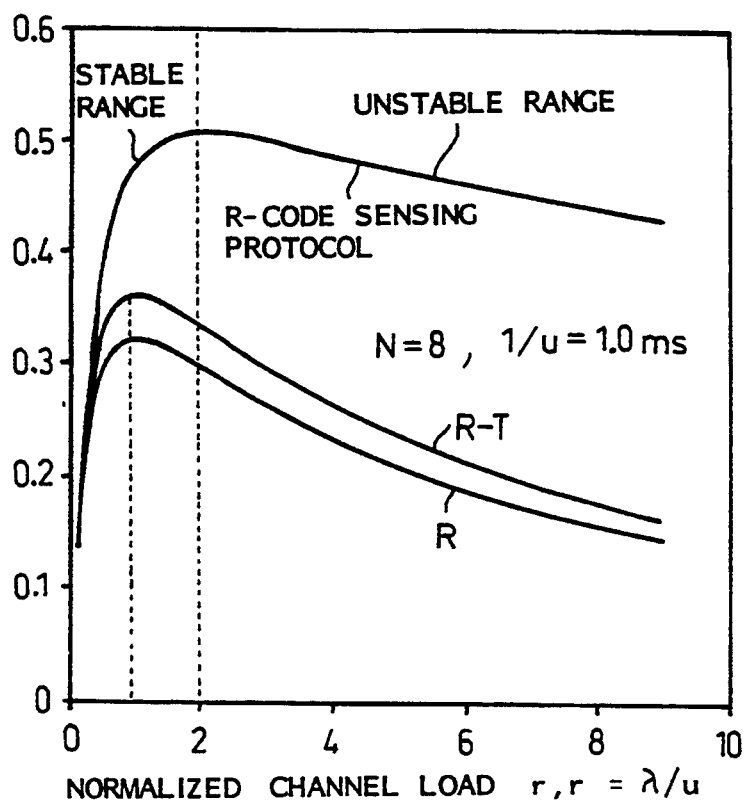
FIG. 1 is a graphic representation of the throughput as a function of normalized channel load.

FIG. 1 shows a graphic representation of the throughputs per pair S(N, r) to be obtained by the method according to the invention (R code sensing protocol) as a function of the packet traffic load r of the channel as compared with the throughout efficiencies obtained by conventional spreading codes (R, R-T). In FIG. 1, the highest curve represents the throughput obtained by the method according to the invention, i.e. the receiver (R) code sensing protocol. The maximum throughput is 0.506, which is clearly higher than that obtained by the conventional R-T or R spreading code protocols represented by the two lowest curves in FIG. 1. In FIG. 1, the maximum throughput to be obtained by the R-T spreading code is only 0.36, which is significantly lower than the value 0.506 obtained by the method according to the invention. The maximum throughput 0.506 is obtained when $\lambda/u$ is 2. The curve portion on the left side of the point where $\lambda/u=2$ represents the stable range of the network and the curve portion on its right side represents the unstable range of the network. As appears from FIG. 1, the stable range of the network is widest in the case of the uppermost curve, that is, in the method employing the R code sensing according to the invention. The higher stability enables each network user to use a higher packet transmission rate $\lambda$.

Figure 2:
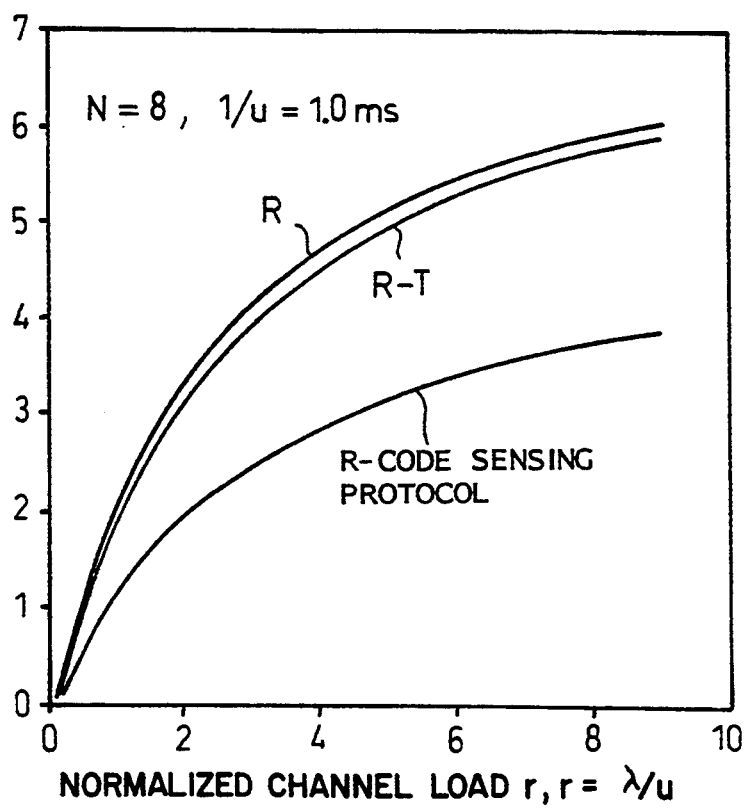
FIG. 2 is a graphic representation of channel backlogs as a function of normalized channel load.

FIG. 2 is a graphic representation of channel backlogs K(N, r) occurring in the method according to the invention (R code sensing protocol) as a function of the packet traffic load r of the channel as compared with backlogs occurring when using the conventional spreading code protocols (R, R-T). The term backlog means the average number of users in blocked state. The lowest curve represents the number of backlogs occurring when using the method according to the invention, that is, the R code sensing protocol. As appears from FIG. 2, the number of backlogs is clearly lower in the method according to the invention as compared with the conventional spreading code protocols. The uppermost curve in FIG. 2 represents the number of backlogs occurring when using the R spreading code protocol, and the middle curve represents the number of backlogs occurring when using the R-T spreading code protocol. As the channel load increases, the number of backlogs with the method according to the invention is only one half of that obtained with the prior art methods, as is apparent from FIG. 2.

Figure 3:
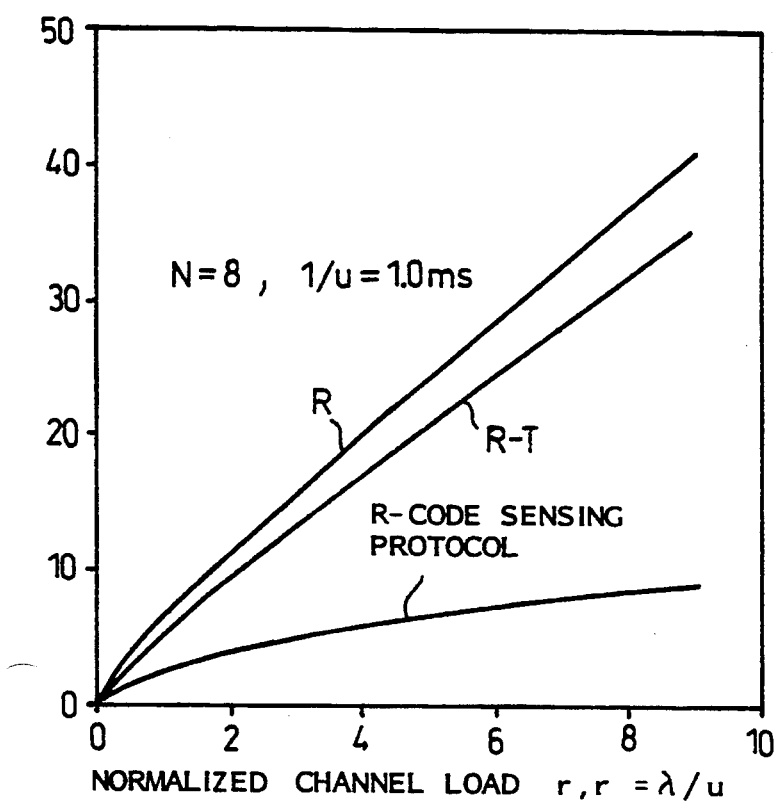
FIG. 3 is a graphic representation of channel delays as a function of normalized channel load.

FIG. 3 is a graphic representation of channel delays D(N, r) as a function of the packet traffic load r of the channel. In FIG. 3, the delay occurring when using the method according to the invention, that is, the R code sensing protocol, is represented by the lowest curve. As is to be seen from FIG. 3, delays in the network employing the method according to the invention are only one fourth of those occurring with the conventional R and R-T protocols when the channel traffic increases.

Figure 4:
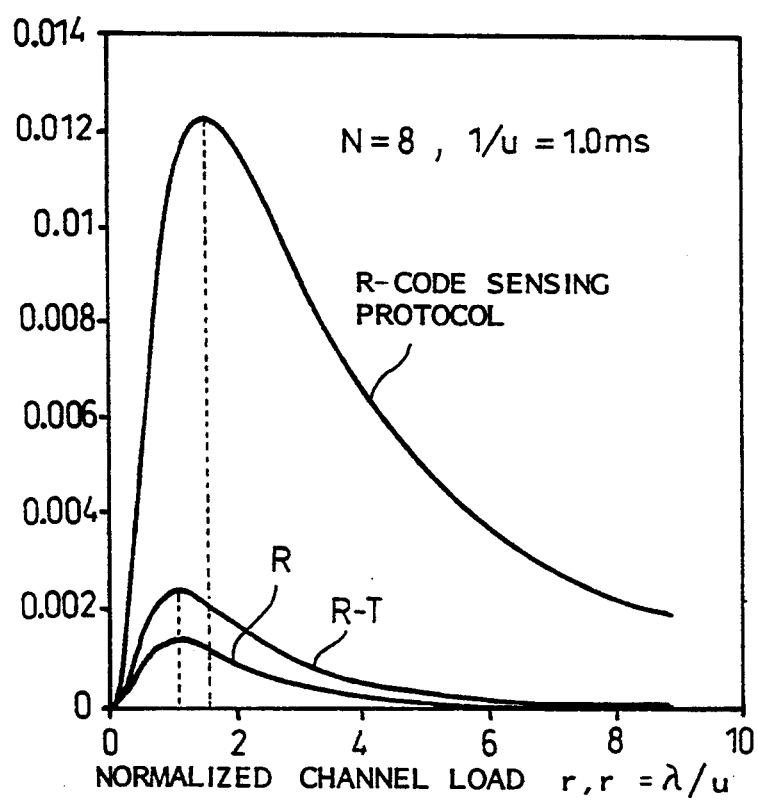
FIG. 4 is a graphic representation of the state occupancy probability as a function of normalized channel load.

The method according to the invention also provides a higher probability of state occupancy p, that is, a higher pairing-up probability between two terminals, as shown in FIG. 4. In FIG. 4, the performance to be obtained by the method according to the invention is represented by the uppermost curve.

Even though the invention has been described above with reference to the examples of the attached drawings, it is obvious that the invention is not restricted to them, but it can be modified in many ways within the inventive idea disclosed in the attached claims.

We claim:

1. A method of controlling the operation of a packet switched CDMA telecommunication network, wherein N network users ($U_{i,j}$) are connected to the network by a respective terminal ($TER_i$, $TER_j$, i, j=1→N), and each terminal ($TER_i$) communicates by means of a transmitter ($T_i$, i=1→N) and a receiver $R_i$, i=1→N) with a receiver ($R_j$) and a transmitter ($T_j$) of another terminal ($TER_j$, j=1→N) via a CDMA channel (1) forming the transmission path, and wherein a substantially orthogonal receiver code ($r_i$, $r_j$, i, j=1→N) is assigned to the terminal ($TER_i$, $TER_j$) of each user, which code is used by the other terminals of the network for addressing and encoding packets to the particular terminal, comprising:

sensing by a network terminal ($TER_i$, i=1→N) wanting to transmit the channel (1) forming the transmission path for the presence of the receiver code ($r_j$) of the receiving terminal ($TER_j$) of the other communicating party, in signals ($S_i$) transmitted by the other terminals, said receiving terminal ($TER_j$) being the terminal to which the sensing terminal ($TER_i$) wants to transmit data in packet format, and if the receiver code ($r_j$) is not detected in the channel, initiating by said terminal ($TER_i$) wanting to transmit the transmission of packet-format data encoded by said receiver code ($r_j$) to the receiver ($R_j$) of the receiving terminal ($TER_j$), whereas if the receiver code ($r_j$) is detected in the channel, remaining waiting of said terminal ($TER_i$) wanting to transmit so as to repeat the sensing step after a period of time.

2. A method according to claim 1, wherein:

said sensing of the channel (1) forming the transmission path for the presence of the receiver code ($r_j$) is carried out by:

applying a signal ($S_i$) derived from the channel (1) and containing receiver codes (r) occurring in signals transmitted by the other terminals, to a correlator ($C_i$) included in the receiver ($R_i$) of the sensing terminal, being the terminal ($TER_i$) wanting to transmit, applying the identifying code ($r_j$) of the other communicating party, being the receiving terminal ($TER_j$) to the correlator ($C_i$) as a reference, and then measuring in an output ($C_i$out) of the correlator ($C_i$) correlation between signal ($S_i$) and identifying code ($Y_j$) as applied to the correlator ($C_i$) in an output ($C_i$out) of the correlator ($C_i$).

3. A method according to claim 2, wherein:

if the level of auto-correlation, being correlation between the receiver codes ($r_j$) already present in the signal ($S_i$) derived from the channel, by being sensed from the channel (1), and the same receiver code ($r_j$) applied to the correlator as a reference, in the output ($C_i$out) of the correlator ($C_i$) exceeds a predetermined threshold value (K), the transmitter ($T_i$) of the sensing terminal, being the terminal ($TER_i$) wanting to transmit remaining waiting and not yet initiating the transmission of the packet to the receiver ($R_j$) of the receiving terminal ($TER_j$), whereas if the level of auto-correlation is less than the predetermined threshold value (K), the sensing terminal, being the terminal ($TER_i$) immediately initiating the transmission of the packet.

* * * * *